Patented Oct. 29, 1940

2,219,700

UNITED STATES PATENT OFFICE 2,219,700

FILM AND ITS MANUFACTURE

Michael Wilcox Perrin, John Greeve Paton, and Edmond George Williams, Northwich, England, assignors to Imperial Chemical Industries Limited, a corporation of Great Britain No Drawing. Application April 21, 1937, Serial No. 138,266. In Great Britain April 29, 1936

5 Claims. (Cl. 260—94)

This invention relates to synthetic pellicles, the invention relates particularly to pellicles, tapes, ribbons, coatings, and the like prepared from the solid polymers of ethylene produced in accordance with the processes described in United States Patent 2,153,553 issued to Fawcett, Gibson, and Perrin. It also relates to pellicles, tapes, ribbons, coatings, and the like prepared from the polymers of ethylene produced in the presence of small quantities of oxygen in accordance with the processes described in the aforementioned application of Fawcett, Gibson, and Perrin, said polymers having a very small quantity of oxygen in chemical combination. In this specification whenever the term "polymers of ethylene" is used, it is intended to include also the polymers which contain a small quantity of oxygen. The ethylene polymer described in the above mentioned patent is obtained by heating ethylene at temperatures of 100° C. to 400° C. under high pressure, that is pressures above 500 atmospheres and preferably above 1000 atmospheres. These polymers are solid at normal temperatures, correspond in composition substantially to $(CH_2)_x$ and by X-ray diffraction analysis show a crystalline structure.

This invention has as an object to provide new and useful pellicles, tapes, ribbons, coatings, and the like, utilizing these new polymers of ethylene. A further object is to provide methods for manufacturing such pellicles, tapes, ribbons, coatings and the like. A still further object is to provide methods for increasing the strength of the pellicles, tapes, ribbons, and the like after they have been formed.

The above and other objects are accomplished by the following invention. We have found that pellicles, tapes, ribbons, coatings, and the like may be made from the solid polymers of ethylene produced in accordance with the processes described in the aforementioned Fawcett, Gibson and Perrin patent by shaping the polymer at a temperature above its softening temperature, i. e., above about 110° C., cooling the shaped polymer to solidify it and if necessary rolling or cutting the solidified polymer into one or more thin strips or sheets.

The polymer may be shaped by extrusion, suitable shapes being rods, tubes, slabs or ribbons. In the case of tubes, the shape may be cut lengthwise and flattened into a sheet or ribbon. Another method of shaping the polymer consists in passing it through a pair of rolls of which one is kept at a temperature above the softening temperature of the polymer and the other is kept cold, the resulting sheet of polymer formed upon the hot roll being cut and stripped off the roll after cooling.

Alternatively, the polymer may be shaped by casting or moulding, thin sheets being cut off the resulting shape by means of a cutting edge. The polymer may be cast or moulded into the form of a disc or cylinder, and by rotating this against the cutting edge a length of tape or ribbon may be obtained.

Alternatively, in an application of the method intended more particularly for the production of films or coatings, in the shaping operation the polymer is applied as a powder or as a solution in a suitable volatile solvent to the surface of a solid body or to the surface of a heavy liquid of high boiling point, e. g., mercury, and is heated to a temperature above its softening temperature (the solvent being removed by evaporation in the case of a solution) under conditions adapted to produce an unbroken sheet or layer of the polymer which, after cooling, may be stripped from the surface.

Rapid cooling of the heated polymer, e. g. by plunging into cold water, leads to transparent products, but if cooling is effected relatively slowly the material tends to be translucent.

The films, coatings, tapes, ribbons and the like obtained by any of the above methods may, if desired, be polished by subjecting them to slight pressure between heated highly-polished surfaces.

In the practice of this invention it is generally preferred to employ polymers having molecular weights of more than about 4,000 as the mechanical strength of the resulting pellicles, tapes, ribbons, coatings, and the like varies with the molecular weight of the polymer employed; the higher the molecular weight of the polymer the higher the mechanical strength of the resulting pellicles, tapes, ribbons, coatings, and the like.

As pointed out above, the tapes, ribbons, pellicles, coatings, and the like of this invention may be made either from melts or from solutions of the polymer. If the films are cast on an amalgamated tin surface, or on freshly cleaned mercury, they may be easily removed. Thin films prepared in this manner are transparent or translucent (as explained above) are flexible, and when subjected to tension stretch appreciably before breaking. In contrast to regenerated cellulose films, these films do not split so easily in the direction of break.

The invention further comprises increasing the strength of the products—pellicles, ribbons, tapes, coatings and the like—manufactured as described above by subjecting them to treatment adapted to produce partial or complete orientation of the molecules in a given direction. Such orientation may be effected by cold rolling, i. e. to rolling at a temperature substantially below the softening temperature of the polymer, and in any case, not exceeding about 80° C. Preferably, cold rolling is carried out to such an extent that the thickness of the material is reduced to about one-fifth of its initial value. We have found that cold rolling to this extent results in the maximum amount of orientation and the maximum increase in strength. In place of cold rolling, other methods of effecting orientation may be employed, as by subjecting the strip or sheet to tension or distention in such a way as to reduce its thickness.

The following examples are submitted to illustrate but do not limit this invention.

EXAMPLE I

This example illustrates the production of pellicles by casting from solution.

To 200 ccs. of tetrahydronaphthalene was added 12 grams of an ethylene polymer having a molecular weight of about 10,000 (produced by heating ethylene at 200° C. under 1500 atmospheres pressure) and the mixture heated with stirring at 100° C. until solution was complete. The solution was poured on an amalgamated tin plate, and the solvent removed by heating at about 115° C. The tin plate was allowed to cool to room temperature, and the film stripped off. The thickness of the film may be varied by properly adjusting the concentration of the solution from which it is cast.

Example I was repeated, except that the film was rapidly cooled by immersion in cold water. The film thus produced was clear and transparent.

Instead of casting on amalgamated tin, the film may be cast on a freshly cleaned mercury surface of pre-determined area.

EXAMPLE II

Example I was repeated, except that the polymer was applied to the substrate in the form of powder, and the composite then heated at 115° C. until a uniform continuous film was formed. The film was then allowed to cool slowly to room temperature, and stripped off. The film thus obtained was uniform and translucent.

EXAMPLE III

This example illustrates the method of making tapes and ribbons.

An ethylene polymer of molecular weight of about 8,000 (produced by heating ethylene at 210° C. under 1500 atmosphere pressure) was heated to about 140° C. and extruded on to a moving band on which it formed a layer. The band thus formed, after cooling, was passed through cold rollers until (the width remaining the same) the length of the band was increased to five times the original value. This "cold rolling" improved the strength of the tape.

Tapes of different thicknesses may be obtained by appropriately adjusting the rate of extrusion and/or speed of the band.

EXAMPLE IV

A thick plate of the polymer was produced by molding the polymer of Example III at a temperature above its softening point under the action of pressure. The plate thus formed was then cold rolled to the desired thickness by passing it through cold rollers until the thickness was reduced to about one-fifth its initial value. The tape thus formed was flexible and tough.

The pellicles, tapes, ribbons, coatings and the like of this invention are highly impermeable to the passage of water vapor as shown below, employing pellicles of various thicknesses:

35° C. and 75% relative humidity

| Film | Thickness in mm. | Diffusion rate (water vapor) mg./sq. in./hr. |
|---|---|---|
| Ethylene polymer | 0.025 | 0.80 |
| Do | 0.35 | 0.35 |
| Regenerated cellulose | 0.030 | 30.60 |
| Do | 0.030 | 27.20 |

20° C. and 100% relative humidity

| Film | Thickness in mm. | Diffusion rate (water vapor) mg./sq. in./hr. |
|---|---|---|
| Ethylene polymer | 0.030 | 0.40 |
| "Moistureproof" regenerated cellulose | 0.030 | 1.20 |
| Styrene polymer | 0.030 | 2.90 |
| Regenerated cellulose | 0.030 | 24.20 |

The above tests were made by stretching pellicles of the thickness indicated across bottles containing calcium chloride, and stored under the temperature and humidity conditions indicated. The bottles were weighed at regular intervals. The results clearly show that at 20° C. and at 100% relative humidity the rate of diffusion of water through a regenerated cellulose film is some 60 times greater than through an ethylene polymer film of similar thickness.

EXAMPLE V

Ethylene polymer was steadily fed between two rollers one of which was kept cold and one of which was kept at a temperature above the softening point of the polymer. The polymer adhered to the hot roll and the process was continued till a film of the desired thickness was built up on the roll. The roll was then allowed to cool and the film stripped from it.

EXAMPLE VI

Ethylene polymer was placed in a mould and heated to 115° C. The mould chosen was of such size and shape that the cross-sectional area was 1/5 of the area of film required.

The polymer was allowed to cool into a block and then slices were cut from the block. These slices were then rolled out in the cold until they covered the area required.

EXAMPLE VII

Ethylene polymer was cast as in Example VI but in a cylindrical mould. The cylindrical block was then rotated on a lathe against a cutting edge adjusted to cut off a length of ribbon or tape. This tape could either be subjected to a cold rolling process or subjected to slight pressure between hot polished surfaces to improve its appearance.

Another method of forming the film is to heat the polymer and extrude it in the form of a tube which after cooling can be slit to form a ribbon.

The remarkable impermeability of these ethylene polymer pellicles, together with their transparency and good mechanical strength, makes then useful as a wrapping material and for protective purposes generally.

If desired, the properties of the pellicles, tapes, ribbons, and coatings of this invention may be modified by incorporation of pigments, fillers and dyes.

The products of this invention are useful as protective coatings for paper, cloth, wire, wood, metals, etc.; in these applications the film may be pre-formed and applied to the substrate with the aid of heat and pressure or it may be formed directly on the substrate. The products are also useful as adhesives for the lamination of similar to similar surfaces, e. g., paper to paper, cloth to cloth, glass to glass, etc.; and of similar to dissimilar surfaces, e. g., paper to cloth, cloth to wood, etc.

Films of the ethylene polymer are highly resistant to the action of many chemicals as evidenced by the fact that they are unaffected by contact with inorganic acids or alkalies either in the cold or at 80 to 90° C.

It is to be understood that where we use the term "film" in the claims it is intended to include films in such forms as pellicles, tapes, ribbons, coatings, and the like.

As many apparently widely divergent embodiments of this invention may be made without departing from the spirit and scope thereof, it is to be understood that we do not limit ourselves to the specific embodiments thereof, except as defined in the appended claims.

We claim:

1. A self-supporting inherently moisture proof film comprising essentially a solid polymer of ethylene which corresponds in composition substantially to $(CH_2)_x$ and which by X-ray diffraction analysis shows a crystalline structure.

2. A transparent self-supporting inherently moisture proof film comprising essentially a solid polymer of ethylene which corresponds in composition substantially to $(CH_2)_x$ and which by X-ray diffraction analysis shows a crystalline structure.

3. A self-supporting inherently moisture proof film exhibiting molecular orientation in one direction, said film comprising essentially a solid polymer of ethylene which corresponds in composition substantially to $(CH_2)_x$ and which by X-ray diffraction analysis shows a crystalline structure.

4. A self-supporting, inherently moisture proof film of wrapping foil thickness comprising essentially a solid polymer of ethylene which corresponds in composition substantially to $(CH_2)_x$ and which by X-ray diffraction analysis shows a crystalline structure.

5. A self-supporting, inherently moisture proof film of not more than 0.035 mm. thickness comprising essentially a solid polymer of ethylene which corresponds in composition substantially to $(CH_2)_x$ and which by X-ray diffraction analysis shows a crystalline structure.

MICHAEL WILCOX PERRIN.
EDMOND GEORGE WILLIAMS.
JOHN GREEVE PATON.

---

CERTIFICATE OF CORRECTION.

Patent No. 2,219,700.   October 29, 1940.

MICHAEL WILCOX PERRIN, ET AL.

It is hereby certified that error appears in the printed specification of the above numbered patent requiring correction as follows: Page 1, first column, line 2, for the words "the solvent being removed by evaporation in the" read --tapes, ribbons, coatings and the like and to--; and that the said Letters Patent should be read with this correction therein that the same may conform to the record of the case in the Patent Office.

Signed and sealed this 3rd day of December, A. D. 1940.

Henry Van Arsdale,
Acting Commissioner of Patents.

(Seal)

CERTIFICATE OF CORRECTION.

Patent No. 2,219,700. October 29, 1940.

MICHAEL WILCOX PERRIN, ET AL.

It is hereby certified that error appears in the printed specification of the above numbered patent requiring correction as follows: Page 1, first column, line 2, for the words "the solvent being removed by evaporation in the" read --tapes, ribbons, coatings and the like and to--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.